(12) United States Patent
Giubertoni

(10) Patent No.: US 9,983,594 B2
(45) Date of Patent: May 29, 2018

(54) PRESSURE INDEPENDENT HYDRAULIC VALVE FOR FLOW CONTROL AND REGULATION

(71) Applicant: VIR VALVOINDUSTRIA ING. RIZZIO S.P.A., Valduggia (Vercelli) (IT)

(72) Inventor: Efrem Giubertoni, Varallo (IT)

(73) Assignee: VIR VALVOINDUSTRIA ING. RIZZIO S.P.A., Valduggia (Vercelli) (IT)

(*) Notice: Subject to any disclaimer, the term of this patent is extended or adjusted under 35 U.S.C. 154(b) by 132 days.

(21) Appl. No.: 15/008,484

(22) Filed: Jan. 28, 2016

(65) Prior Publication Data

US 2016/0246306 A1 Aug. 25, 2016

(30) Foreign Application Priority Data

Feb. 20, 2015 (IT) .............................. MI2015A0255

(51) Int. Cl.
*F16K 1/48* (2006.01)
*F16K 1/54* (2006.01)
(Continued)

(52) U.S. Cl.
CPC ............. *G05D 7/01* (2013.01); *G05D 7/0106* (2013.01)

(58) Field of Classification Search
CPC ... F16K 1/38; F16K 1/48; F16K 1/487; F16K 1/50; F16K 1/54; F16K 31/508;
(Continued)

(56) References Cited

U.S. PATENT DOCUMENTS

| | | | | |
|---|---|---|---|---|
| 324,486 A | * | 8/1885 | Reilly .................. | F16K 31/508 251/266 |
| 4,231,549 A | * | 11/1980 | Visalli .................. | F16K 31/508 251/269 |
| 5,364,066 A | * | 11/1994 | Dorste ...................... | F16K 1/38 251/122 |

(Continued)

FOREIGN PATENT DOCUMENTS

| WO | 00/58802 A1 | 10/2000 |
|---|---|---|
| WO | 2004/107075 A1 | 12/2004 |

(Continued)

OTHER PUBLICATIONS

Italian Search Report, dated Nov. 4, 2015, from corresponding Italian application.

*Primary Examiner* — Seth W Mackay-Smith
(74) *Attorney, Agent, or Firm* — Young & Thompson

(57) ABSTRACT

A pressure independent control valve for controlling liquid flow includes a tubular body having an inlet duct and an outlet duct coaxial with each other, a central body arranged therebetween with an axis inclined with respect to the inlet and outlet ducts and including an upstream chamber and a downstream chamber coaxial with each other and communicating through an adjustment orifice, the upstream chamber and downstream chamber suitable for housing a first functional group defined by a control device for controlling the differential pressure between upstream of the orifice in correspondence of the upstream chamber and downstream of the orifice in correspondence with the outlet duct, and a second functional group coaxial to the first functional group and defined by an adjustment device suitable for increasing or decreasing the passage of fluid through the orifice, the device including axial actuation elements both rotationally operable and in axial translation.

10 Claims, 5 Drawing Sheets

(51) Int. Cl.
  *F16K 31/50*  (2006.01)
  *F16K 35/02*  (2006.01)
  *G05D 16/06*  (2006.01)
  *G05D 7/01*  (2006.01)

(58) Field of Classification Search
  CPC ............. F16K 35/027; F24D 19/1018; G05D 16/0663; G05D 7/01; G05D 7/0106
  USPC .......................... 251/273, 278, 285, 286, 288
  See application file for complete search history.

(56) References Cited

U.S. PATENT DOCUMENTS

| | | | | |
|---|---|---|---|---|
| 5,860,591 | A * | 1/1999 | Gylov | G05D 7/0106 |
| | | | | 236/42 |
| 6,827,100 | B1 * | 12/2004 | Carlson | G05D 7/0106 |
| | | | | 137/454.6 |
| 7,967,023 | B2 * | 6/2011 | Jorgensen | F24D 19/1015 |
| | | | | 137/201 |
| 8,763,632 | B2 * | 7/2014 | Loeffler | G05D 7/005 |
| | | | | 137/497 |
| 2010/0170581 | A1 * | 7/2010 | Loeffler | G05D 7/005 |
| | | | | 137/455 |
| 2011/0197627 | A1 * | 8/2011 | Labrie | F16K 1/54 |
| | | | | 62/529 |

FOREIGN PATENT DOCUMENTS

| | | | |
|---|---|---|---|
| WO | WO 2004107075 A1 * | 12/2004 | ......... F24D 19/1015 |
| WO | 2006/136158 A1 | 12/2006 | |
| WO | 2009/127173 A1 | 10/2009 | |
| WO | 2009/135490 A2 | 11/2009 | |

* cited by examiner

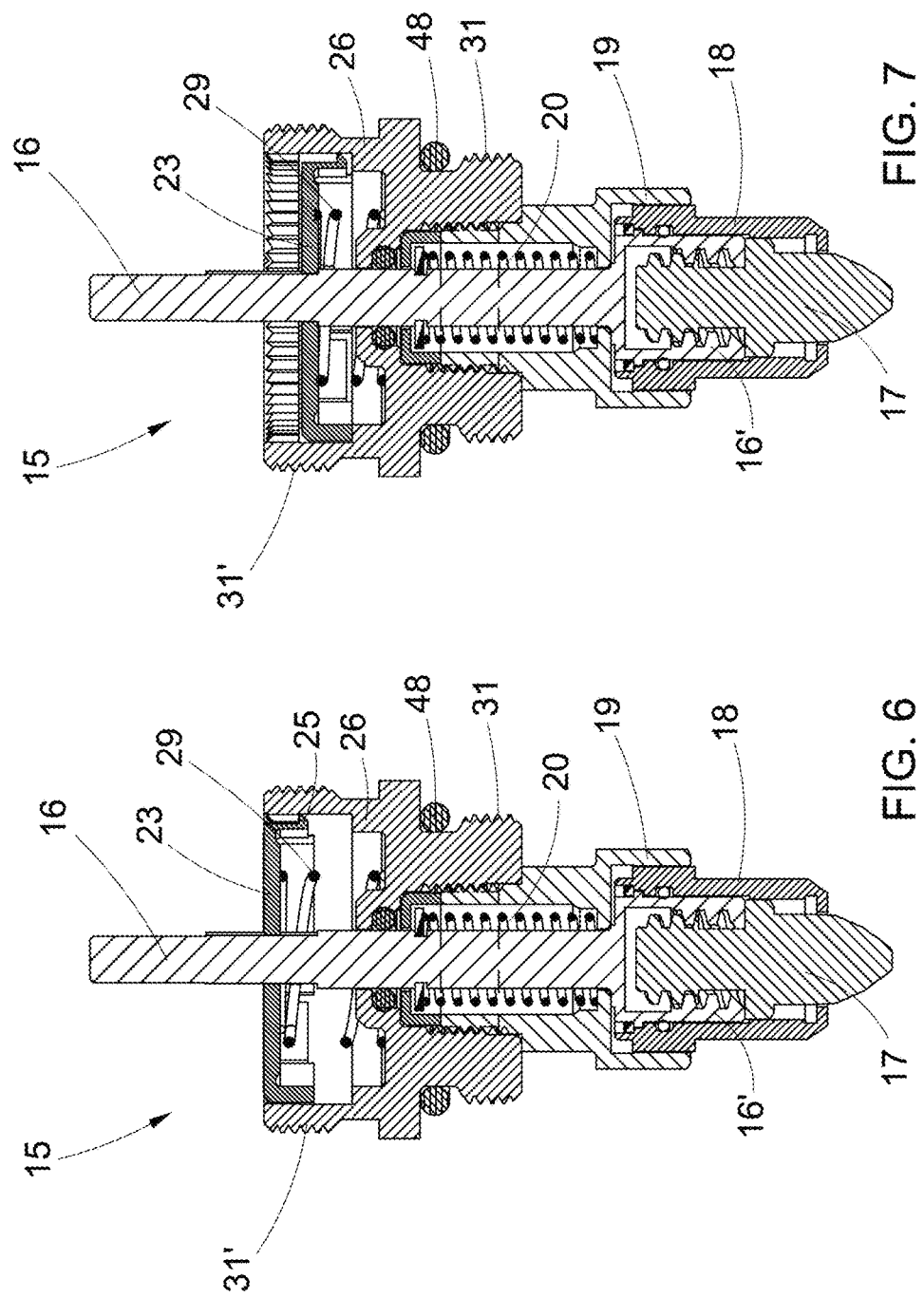

PRESSURE INDEPENDENT HYDRAULIC VALVE FOR FLOW CONTROL AND REGULATION

BACKGROUND OF THE INVENTION

Field of the Invention

The object of the present invention is a pressure independent flow control valve.

More particularly the present invention relates to a pressure independent control valve PICV for controlling the flow of a liquid medium (water or water-based solutions), especially and typically suitable for use in heating or cooling systems, for example in the circuits for distribution of a thermal carrier fluid.

Description of the Related Art

As is known, valves are extensively present and widespread on the market for the control and the regulation of a flow of liquid in a manner independent of pressure for applications in the circuits for distribution of a thermal carrier fluid in heating and/or cooling systems wherein this type of valve is often associated with each terminal, more specifically with each heat exchanger, present in the system.

Each terminal is characterised by a rated working flow rate and, at installation, the control and regulation valve is set manually in such a way as to guarantee a flow value corresponding to the rated working flow rate of the terminal with respect whereto it is associated and independent of possible variations of pressure which may occur in the circuit.

Traditionally, valves for the control and regulation of the flow of liquid are governed by an electronic device by means of a linear actuator, so as to regulate or interrupt the flow of thermal carrier fluid.

In some constructional solutions this electronic control device only alternates in time the periods of opening and closure of the valve (for example in the case of ON/OFF motors), but in more advanced constructional solutions (the case of modulating motors) it continually regulates the level of opening/closure of the same valve in order to maintain in time an optimal continual flow rate whose value may undergo variations linked to external factors (for example crowding of spaces or sun radiation) and which is continually recalculated by the electronic control device.

In the case, for example, of use of a control and regulation valve in combination with a modulating linear motor, it is appropriate that this valve is provided with a structure suitable for exploiting the entire stroke of the actuator so as to be able to distribute the modulation (this is typically referred to as full stroke modulation) as, for example, described in WO2006/136158.

Other known constructional solutions, instead, for modulation exploit the residual portion of linear stroke of the rod of the actuator after manual regulation has been performed, as described in the document WO2004/107075.

The aforementioned valves for regulating and controlling flow, taking account of the fact that they have to be easy to regulate by hand and that they may be located so as to be difficult to inspect, must include means suitable for guaranteeing in time the security of said valves with respect to the possibility of an accidental change to the regulation set manually. To solve this problem some valves comprise means for mechanically blocking the regulation (as described, for example, in US2010/0170581) or use screwed components which block the regulation through friction.

As well as the aspects defined above, known regulation and control valves must meet features of compactness, reduced dimensions and reduced number of components so as to be able to contain the overall dimensions for better adaptation to the systems, as described in WO2009/135490.

However the valves for regulation and control of the flow of a liquid medium currently known and present on the market do not comprise all the above-defined features of a single example of valve.

BRIEF SUMMARY OF THE INVENTION

The object of the present invention is that of obviating the disadvantages typical of traditional regulation and control valves.

More particularly the object of the present invention is that of providing a pressure independent flow control valve which combines in a single device the features described above.

A further object of the present invention is that of providing a flow control valve which allows the modulation of the value of the flow to be distributed always along the entire stroke of the rod of the actuator.

A further object of the present invention is to make available to users a pressure independent flow control valve suitable for ensuring a high level of resistance and reliability in time and such, moreover, as to be easily and economically produced.

These and other objects are achieved by the invention which has the features as claimed in claim 1.

According to the invention a pressure independent control valve for controlling the flow of a liquid medium is provided, comprising a body defined by a tubular element comprising an inlet duct and an outlet duct coaxial with each other, a central body arranged in an intermediate position and with axis inclined with respect to said inlet duct and outlet duct and comprising an upstream chamber and a downstream chamber coaxial one with the other and in communication through an adjustment orifice, said upstream chamber and downstream chamber suitable for housing, respectively, a first functional group defined by a control device for controlling the differential pressure between upstream of the adjustment orifice in correspondence of the upstream chamber, and downstream of said adjustment orifice, in correspondence with the outlet duct, and a second functional group coaxial to said first functional group and defined by an adjustment device suitable for increasing or decreasing the passage of fluid through the adjustment orifice, the control valve wherein the adjustment device comprises single actuation means both rotationally operable for a pre-adjustment of the fluid passage area of the adjustment orifice and in axial translation for its further adjustment and therefore for a modulation of the flow of the fluid through said adjustment orifice.

Advantageous embodiments of the invention are disclosed by the dependent claims.

BRIEF DESCRIPTION OF THE DRAWINGS

The constructional and functional features of the pressure independent flow control valve of the present invention will be made clearer by the following detailed description, in which reference is made to the accompanying drawings which represent a preferred and non-limiting embodiment thereof and in which:

FIGS. 6 and 7 show schematically and in axial section two working positions of the valve portion of the invention according to FIG. 2.

DETAILED DESCRIPTION OF THE PREFERRED EMBODIMENTS

Figure 1:
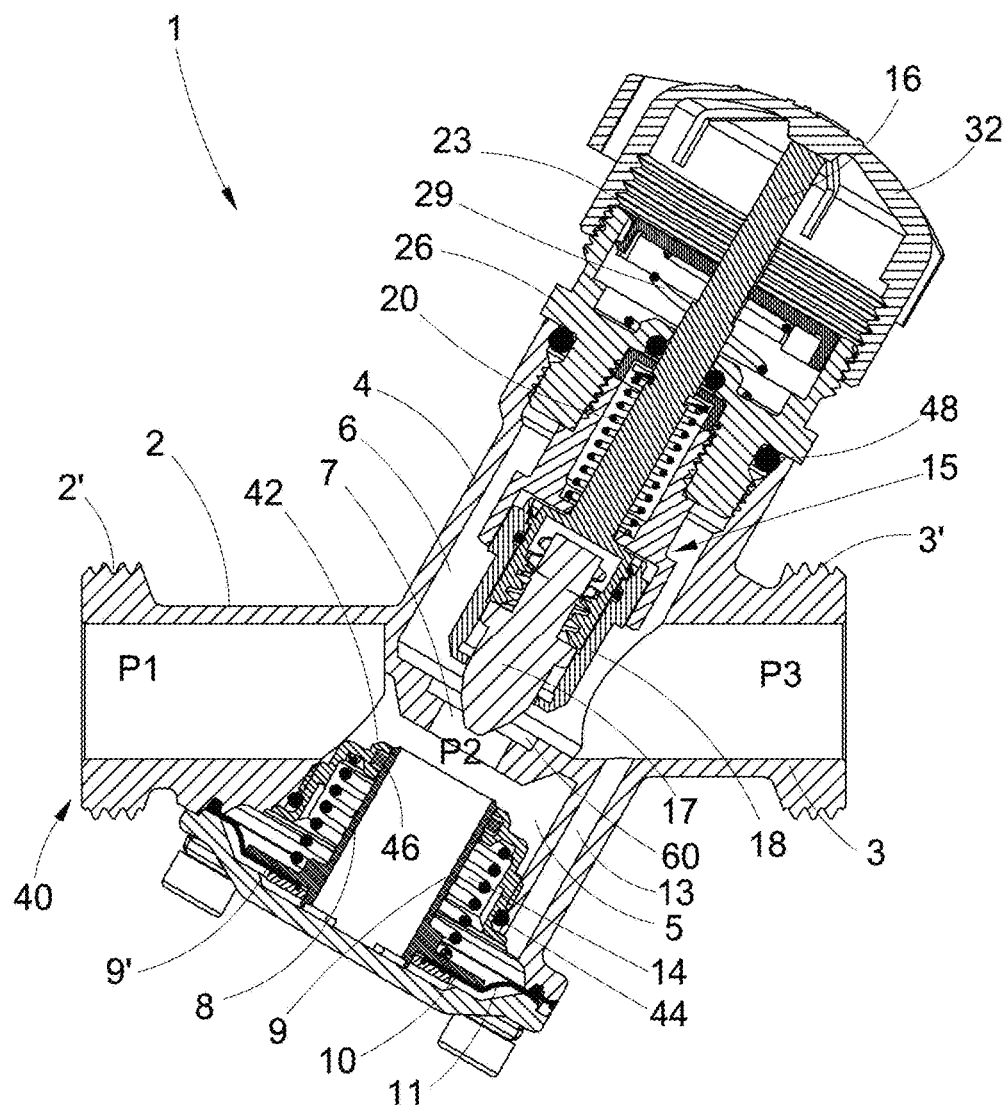
FIG. 1 represents schematically a sectioned view of a pressure independent flow control valve of the present invention.

Referring to the aforesaid drawings the pressure independent valve for controlling the flow of a liquid medium of the present invention, denoted overall by 1 in the assembly shown in FIG. 1, comprises a body 40, preferably made in copper or alloys thereof or in another material suitable for the purpose, defined by a tubular element comprising an inlet duct 2 provided with a threaded end attachment 2' and an outlet duct 3 likewise provided with a threaded end attachment 3', with said inlet and outlet ducts coaxial one to the other, and a central body 4 placed in an intermediate position with respect to the inlet duct 2 and to the outlet duct 3 and with axis substantially inclined with respect to the axis of the aforementioned ducts 2 and 3.

The central body 4 comprises two coaxial chambers defined by an upstream chamber 5 and by a downstream chamber 6.

Said upstream chamber 5 and downstream chamber 6 are coaxial one with the other and in communication through an adjustment orifice 7 formed coaxially to said chambers.

Inside the upstream chamber 5 a first functional group is housed, defined by a device for controlling the differential pressure 8 having the function of maintaining constant, in an automatic manner, the difference between a value of pressure P2 in the section upstream of the adjustment orifice 7 (i.e. on the side of the upstream chamber 5) and a value of pressure P3 downstream of the same adjustment orifice 7 (understood to be the pressure at the outlet duct 3).

The device for controlling the differential pressure 8 comprises a mobile element 9 with tubular cylindrical geometry, coaxial to the upstream chamber 5 and sliding axially in the direction of the adjustment orifice 7 to limit or choke the passage of the flow of fluid and introduce, in this way, a difference between a pressure value P1 of the fluid in a point of the inlet duct 2 and the pressure value P2 of the fluid measured immediately upstream of the adjustment orifice 7 (i.e. at the upstream chamber 5).

The mobile element 9 develops, at the end opposite the one turned in the direction of the adjustment orifice 7 and in a radial direction away from the outer side surface of said mobile element, an annular appendage 9' apt to allow the abutting of an integral disk 10 and of a diaphragm 11 comprised and secured between said annular appendage 9' and said disk 10.

The diaphragm 11 is likewise blocked at its outer perimeter portion by means of a plug 12 which closes the upstream chamber 5 below.

This diaphragm 11, together with the disk 10, is subject on one side to a thrust exerted by the fluid at the pressure P2 and on the other side to a thrust exerted by the fluid at the pressure P3 which reaches the zone of the diaphragm through a capillary channel 13 formed in the body 4. The diaphragm 11 is likewise subject to a thrust action exerted by an elastic element defined by a helical spring 14 fitted externally and coaxially to the mobile element 9 and acting in the same direction as the pressure P3.

The complex or assembly defined by the mobile element 9 and by the helical spring 14 is enclosed in a bell-shaped body 42 secured with respect to the body 4 and provided, at the upper portion, with a central opening apt to allow the axial sliding of the mobile element 9 under the action of the diaphragm 11. Gaskets 44 and 46 ensure the sealing of the bell-shaped body 42 with respect to the body 4 and to the mobile element 9.

The equilibrium between the three aforementioned thrusts determines the position of the assembly formed by the mobile element 9, by the disk 10 and by the diaphragm 11 and defining a device which reacts automatically to the variations of the pressures P1 and P3, in such a way as to maintain virtually constant the difference between the pressures P2 and P3, which act on the opposite surfaces of the diaphragm 11.

Figure 2:
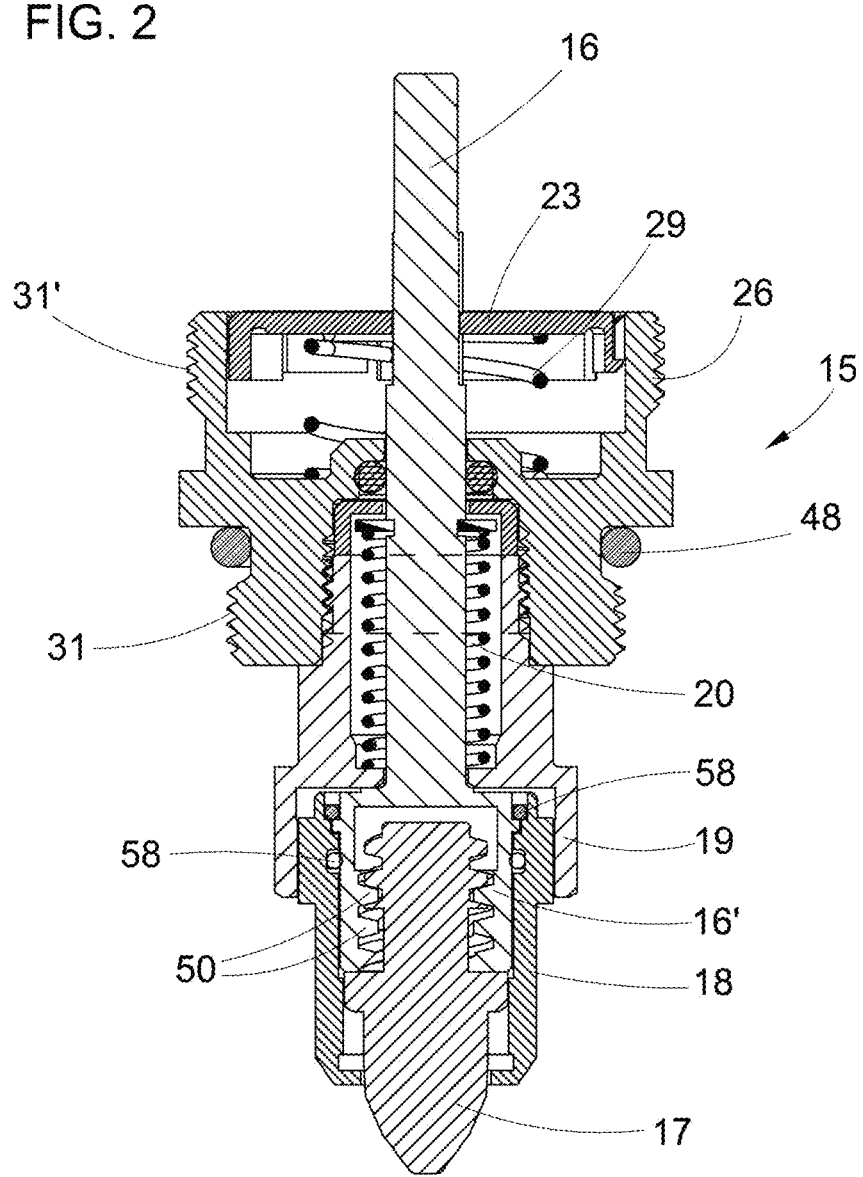
FIG. 2 represents schematically an enlarged sectioned view of a portion of the valve according to FIG. 1.

The downstream chamber 6 is the seat of housing of a second functional group coaxial to the first functional group and defined by an adjustment device 15, shown in greater detail in FIG. 2, which comprises a rod 16 longitudinally developed in the axial direction of the downstream chamber 6 and apt to be moved in axial sliding by means of a linear actuator optionally mounted on the valve 1 and attached thereto by means of a threaded connection.

More particularly, at the end of the downstream chamber 6 opposite the adjustment orifice 7 and closing said same chamber, a screwed portion 26 is inserted and attached with a threaded connection or another known type and provided with a threaded portion 31 formed on the inner surface of an end turned in the direction of the adjustment orifice 7 and with a further threaded portion 31' formed on the outer surface of the end turned to the opposite side with respect to that of connection with the central body 4, with said further threaded portion 31' suitable for coupling with the aforementioned linear actuator or with a screwable closure plug 32 as detailed more clearly here below.

The sealing between said screwed portion 26 and the central body 4 of the valve 1 is obtained by means of a gasket 48.

The rod 16, which has a longitudinal development with circular section, at the end turned in the direction of the adjustment orifice 7 has a threaded profile 50 suitable for allowing the coupling with a corresponding threaded profile of a conical tip 17.

Said rod 16 can translate axially through the effect of the actuation imposed by the optional linear actuator or by the screwable closure plug 32 and, consequently, imposes the movement of the conical tip 17 which goes to limit the pre-regulated area of passage of the fluid in the adjustment orifice 7.

The conical tip 17, through the effect of the rotation of the rod 16, translates axially with respect to the internal side surface of a tubular shutter 18 whereto it is restrained with a prismatic coupling. The shutter 18 is placed coaxially and externally to the rod 16, restrained thereto with respect to the axial translation and axially sliding by means of a prismatic guide inside a sleeve 19 fixed with respect to the central body 4 of the valve 1, with said sleeve which, as schematised in the preferred embodiment shown in the drawings, is preferably attached coaxially to the screwed portion 26 with a threaded connection.

The sealing between the rod 16 and the shutter 18 is guaranteed by sealing rings 58. The prismatic coupling between the shutter 18 and the rod 16 is such as to restrain said shutter with respect to the rod as regards the translation and means that the two components are independent one from the other with reference to the rotation.

Said shutter 18 moreover comprises an element of resilient material (not shown) which, when the valve is in a condition of "all closed", presses against a seat 60 of the valve body at the adjustment orifice 7 guaranteeing in this way a complete interruption of the flow of liquid in the direction of the outlet duct 3.

An elastic element, defined by a helical spring 20, fitted on the rod 16 and inserted in the sleeve 19, maintains the rod in "all open" position for the adjustment orifice 7.

By virtue of the above described combinations of restraints, with a rotation of the rod 16 an axial translation of the conical tip 17 is performed and with an axial translation of the same an axial translation both of the conical tip 17 and of the shutter 18 integrally with the rod is performed.

Therefore, more specifically, a rotation of the rod 16 actuated manually imposes an axial translation of the conical tip 17 and, taking account of the fact that the axial position of the conical tip 17 with respect to the adjustment orifice 7 defines the area useful for the passage of the flow of fluid, allows setting of an initial regulation or pre-adjustment of the valve 1, while the translation of the same rod 16, exerted by means of the screwable closure plug 32 or an optional linear actuator, determines a translation of the conical tip 17 and of the shutter 18 (integral with the rod in the phase of translation) so as to allow a further modulation of the value of the useful area for the passage of the flow of fluid, and therefore of the flow, in a range comprised between a value of initial manual setting (pre-adjustment) and zero (complete closure of the adjustment orifice) on the basis of the axial translation imposed on the rod 16 and always distributing said modulation over the entire axial stroke of said rod 16 which is comprised between the "all open" position (rest position imposed by the helical spring 20) and the "all closed" position defined by the condition of the shutter 18 abutting on the seat 60 of the body.

Figure 3:
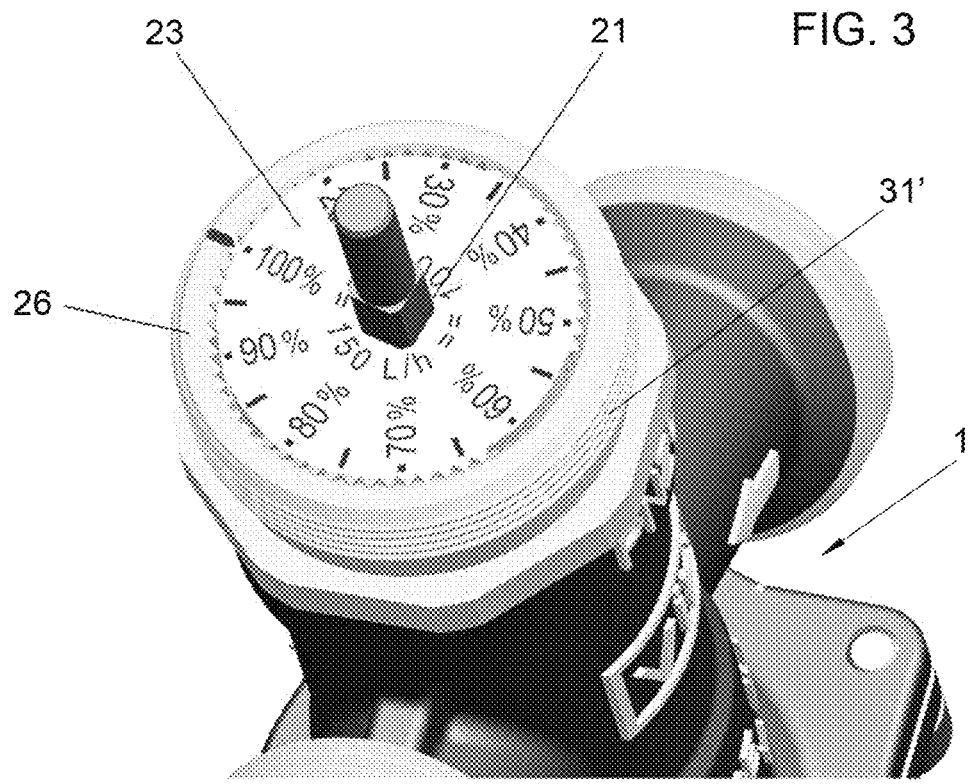
FIG. 3 represents schematically an axonometric view from above of a portion of the valve of the invention.
Figure 4:
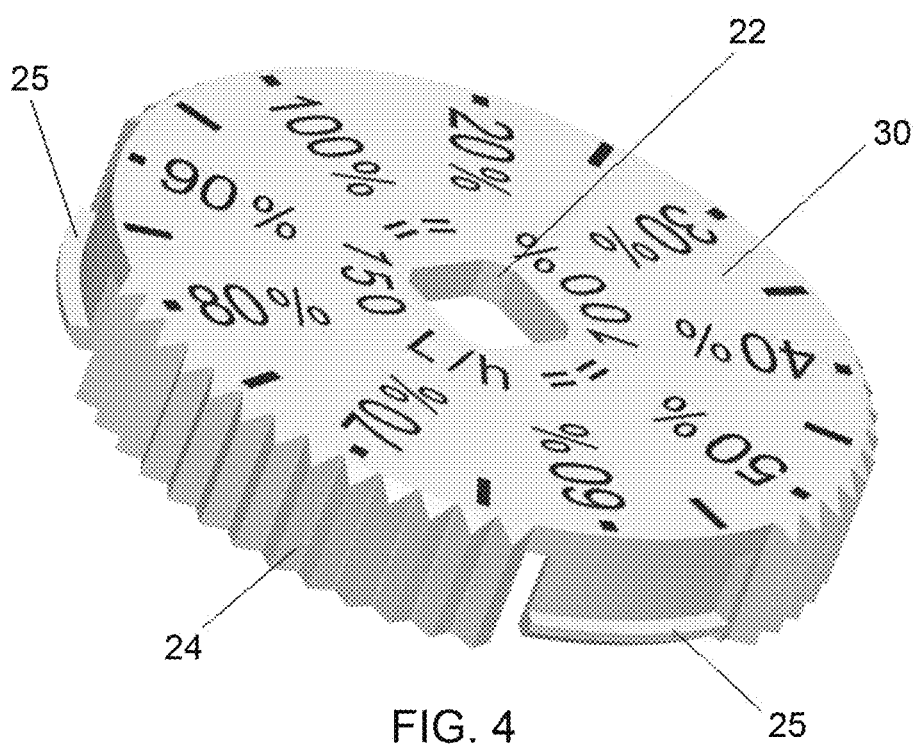
FIG. 4 represents schematically an axonometric view of an enlarged detail of the portion as shown in FIG. 3.
Figure 5:
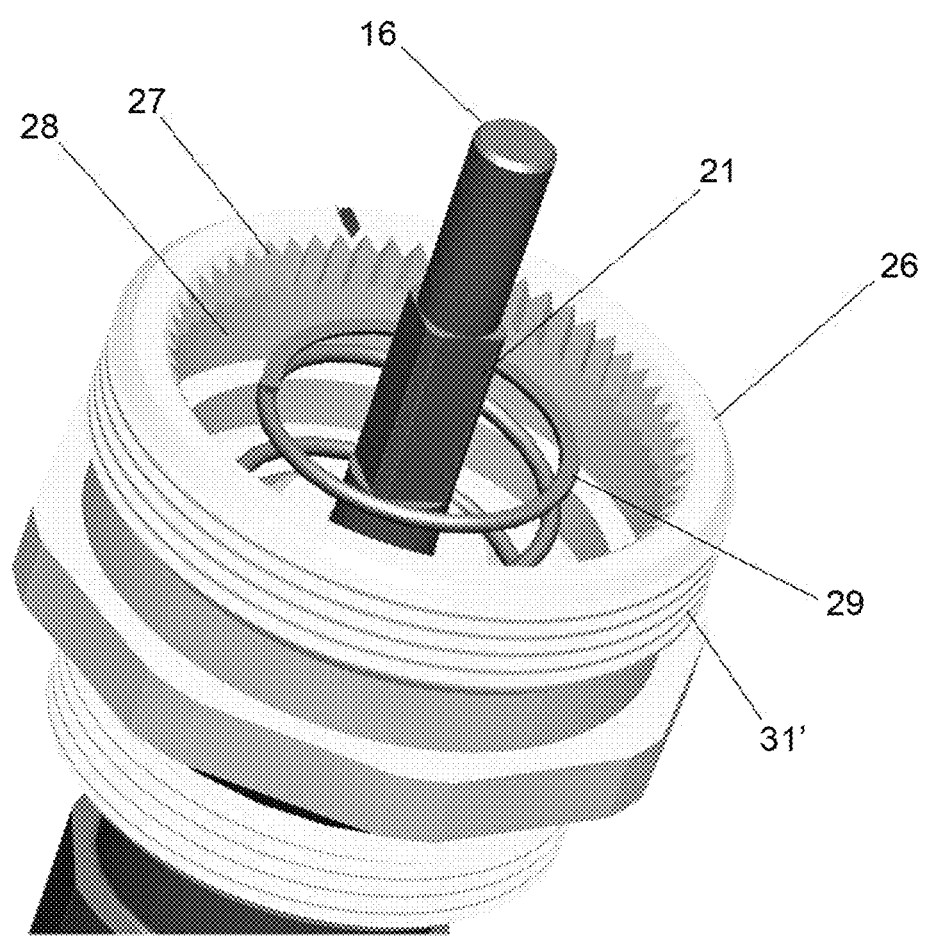
FIG. 5 shows a schematic axonometric view of a detail of the upper portion of the valve of the invention as shown in FIG. 3.

With particular reference to FIGS. 3 to 5, in the upper part of the rod 16 and on the opposite side with respect to that of the tubular expansion 16', said rod has a portion with prismatic development 21 apt to allow the coaxial insertion of a disk 23 provided with a central opening 22 whose geometry corresponds to the prismatic geometry of the portion 21 of the rod 16. The aforementioned geometries allow the performing of an anti-rotational prismatic restraint or coupling and such as to allow translation alone, as detailed here below, of said disk 23 with respect to said rod 16.

Referring to FIG. 4, the disk 23 comprises, likewise, an outer edge provided with grooves 24 formed in sections along the perimeter of said edge and in a direction parallel to the axis of the same disk, with said grooves which alternate with gripping teeth 25 projecting externally in a radial direction and characterised by the fact of being elastically deformable for the function described here below. Said gripping teeth 25 are formed at the portions of the outer edge not occupied by the grooves 24.

On the upper front of the disk 23 FIG. 30 are stamped or engraved or formed in another way, defining a graduated scale apt to provide the operator, on the basis of the angular position of the disk 23 and of the consequent rotation of the rod 16 with respect to the screwed portion 26, an indication of the degree of opening/closure of the valve as detailed further on.

As schematised in the detail of FIG. 5, the screwed portion 26 on the opposite side with respect to that of attachment to the body 4 of the valve 1 comprises an internal annular portion provided with a toothed profile 27 conjoined with the profile of the grooves 24 of the disk 23.

Said screwed portion 26, below the toothed profile 27, comprises an annular indentation 28 having the function of defining a seat of housing for the gripping teeth 25 of the disk 23.

As schematised in FIGS. 1, 2 and 5, when the valve 1 is assembled, inside the screwed portion 26, on the side opposite to that of connection with respect to the sleeve 19, an elastic element is placed, defined by a helical spring 29 fitted on the rod 16 and placed in intermediate position between said screwed portion and the disk 23.

During the phase of assembly of the disk 23 with the screwed portion 26 attached on the sleeve 19, said disk is fitted on the rod 16 and slides axially along the same, going to insert in the screwed portion 26, with the grooves 24 of the disk 23 which mesh with the toothed profile 27 of the screwed portion 26 and with the gripping teeth 25 which deform elastically to allow the insertion and the sliding of the disk 23 with respect to the screwed portion 26 and which return in undeformed position when the disk 23 reaches the indentation 28 of the screwed portion 26, creating a stop abutment against the base or bottom of the toothed profile. In this way the accidental outstroke of the disk 23 from the screwed portion 26 is prevented.

The helical spring 29, with its elastic action, maintains the grooves 24 of the disk 23 always meshed with the toothed profile 27 and, consequently, avoids an unfortunate and accidental change of the regulation of the valve.

Referring to FIGS. 6 and 7, the conditions of mechanical unblocking and blocking of the valve are shown for the required regulation of the aperture of the adjustment orifice 7 and consequently of the regulation of the valve of the invention.

More particularly FIG. 6 shows the condition of mechanical blocking wherein, as already described previously, the disk 23 finds itself with the grooves 24 meshed with the toothed profile 27 of the screwed portion 26 and is maintained in this position by means of the action of the helical spring 29.

The condition of unblocking and, consequently, the possibility of performing a pre-adjustment of the area of passage of the fluid through the adjustment orifice 7, is shown in FIG. 7 in which the operator, after having removed the closure plug 32 or the linear actuator, pressing and pushing the disk 23 in axial direction with a force greater than the contrast force exerted by the helical spring 29, determines the disengaging thereof from the meshing with the toothed profile 27 of the screwed portion 26, so as to be able to rotate it as a function of the required regulation for the valve.

Once the pre-adjustment has been performed the disk 23 returns in the original position through the effect of the action of elastic return of the helical spring 29, making an accidental change of the pre-adjustment set impossible. Subsequently the closure plug 32 or the linear actuator is repositioned so as to be able to proceed, if necessary, with a further modulation of the flow of the fluid passing through the adjustment orifice 7.

As can be seen from the above the advantages that the control valve of the invention achieves are clear.

The pressure independent control valve (PICV) for controlling the flow of a liquid medium of the present invention allows advantageously, taking account of the constructional features detailed above, the distribution always of the modulation of the value of the flow along the entire stroke of the rod of the actuator comprised between the position of "all open" and the position of "all closed" of said valve.

Further advantageous is the fact that the valve for controlling the flow of the invention is of compact structure, of reduced size and made so as to allow an optimised adaptation to the systems.

A further advantage is represented by the fact that the regulation of the valve for the regulation of the flow is simple and easy to perform, taking account of the presence of the graduated disk which allows the pre-adjustment of the degree of opening of the same valve and at the same time ensures the impossibility of accidental changes to the pre-adjustment set.

Although the invention has been described above with particular reference to one of its embodiments given solely by way of a non-limiting example, numerous changes and variations will appear clear to a person skilled in the art in light of the description given above. The present invention therefore intends to embrace all the changes and variations which come within the scope of the following claims.

The invention claimed is:

1. A pressure independent control valve (PICV) for controlling flow of a liquid medium, comprising:
   a body (40) defined by a tubular element comprising an inlet duct (2) and an outlet duct (3) coaxial with each other along a first axis,
   a central body (4) arranged in an intermediate position between the inlet duct (2) and the outlet duct (3), the central body having a second axis substantially inclined with respect to the first axis of said inlet duct (2) and said outlet duct (3),
   the central body (4) comprising an adjusting orifice (7), and an upstream chamber (5) and a downstream chamber (6) coaxial with each other and in communication through the adjustment orifice (7),
   a first functional group comprised of a control device (8) that controls a differential pressure between i) upstream of the adjustment orifice (7), in correspondence of the upstream chamber (5), and ii) downstream of said adjustment orifice, in correspondence with the outlet duct (3), and
   a second functional group coaxial to said first functional group and comprised of an adjustment device (15) adjustable to increase and decrease a fluid passage area available for the liquid flow through the adjustment orifice (7),
   said upstream chamber (5) and downstream chamber (6) housing, respectively, the first functional group and the second functional group, wherein,
   the adjustment device (15) comprises a single actuation means both rotationally operable for a pre-adjustment of the fluid passage area of the adjustment orifice (7) and also operable in axial translation for a further adjustment of said fluid passage area with a resulting modulation of liquid flow through said adjustment orifice (7),
   said actuation means of the adjustment device (15) being comprised of a rod (16) longitudinally developed, equipped at the end facing the adjustment orifice (7) with a threaded profile (50) that couples with a corresponding threaded profile of a conical tip (17) so as to define a screw-drive coupling,
   the actuation means providing both an axial forward movement of said conical tip (17) by a manual rotation of the rod (16) and a rigid translation of the rod (16) and the conical tip (17) assembly in case of axial translation of the rod, and
   said adjustment device (15) further comprises a disk-shaped element (23) mounted on the rod (16), the disk-shaped element (23) providing a display of the pre-adjustment set for the valve and avoids accidental variation of said pre-adjustment.

2. The control valve according to claim 1, wherein the rod (16) of the actuation means of the adjustment device (15) is arranged internally and coaxially to a sleeve (19) fixed to the central body (4) by a screwed portion (26) fixed to said central body (4) at an opposite end with respect to the adjustment orifice (7) for closing the downstream chamber (6).

3. The control valve according to claim 2, wherein the rod (16) is externally and coaxially fitted to a tubular shutter (18) restraint in translation with respect to the rod (16), but rotationally independent from the rod (16) and axially sliding inside the sleeve (19) by a prismatic guide together with the conical tip (17) and the rod (16).

4. The control valve according to claim 3, wherein the conical tip (17) is axially sliding with respect to the shutter (18) by a coupling defined on an inner lateral surface of the shutter (18) arranged coaxially and externally to the rod (16), said shutter being axially sliding with respect to the prismatic guide formed on the inner lateral surface of the sleeve (19) of the adjustment device (15).

5. The control valve according to claim 2, wherein said disk-shaped element (23) provides for manual actuation of the manual rotation of the rod (16), said disk-shaped element (23) being provided with a graduated scale defined by numbers (30), inserted in the screwed portion (26) on a side opposite to that of connection of said screwed portion (26) with the sleeve (19), the disk-shaped element (23) being fitted coaxially to said rod (16) and slidably coupled to said rod (16) with an anti-rotation restraint defined by a central opening (22) of said disk-shaped element (23) with a geometry corresponding to a prismatic development portion (21) of the rod (16).

6. The control valve according to claim 5, wherein said disk-shaped element (23) comprises an external edge provided with grooves (24) formed along a perimeter of said edge and according to a direction parallel to the axis of the disk-shaped element (23), with said grooves alternating with gripping teeth (25) externally projecting according to a radial direction and elastically collapsible, the grooves (24) coupling with a mating toothed profile (27) formed along an internal annular portion of the screwed portion (26) and the gripping teeth (25) creating a stop against the base or bottom of the toothed profile (27) in correspondence of an annular groove (28) formed internally to the screwed portion (26) below said toothed profile (27), preventing an outstroke of the disk-shaped element (23) from the screwed portion (26) notwithstanding a push of an elastic element (29) pushing the disk-shaped element (23) against the screwed portion (26), ensuring engagement of the grooves (24) with the toothed profile (27).

7. The control valve according to claim 2, further comprising a closing cap (32) screwed, manually operated, fitted on said screwed portion (26) and adapted to force a sliding in an axial direction of the rod (16).

8. The control valve according to claim 2, further comprising a linear actuator fitted on the screwed portion (26) and adapted to force an axial sliding of the rod (16).

9. A method for controlling the flow of a liquid medium using the pressure independent control valve according to claim 2, the method comprising the following steps for the pre-adjustment of the passage area of the fluid through the adjustment orifice (7):
- removal of the closing cap (32) and manually pushing of the disk-shaped element (23) toward a bottom of the screwed portion (26) of the adjustment device (15) so as to disengage grooves (24) of said disk-shaped element (23) from the contact with a toothed profile (27) of said screwed portion (26);
- manually rotating the disk-shaped element (23) to cause a rotary movement of the rod (16) which causes a forward translatory movement of the conical tip (17) towards the adjustment orifice (7);
- releasing of the manually pushing on the disk-shaped element (23) and repositioning of the disk-shaped element (23) with the grooves (24) in meshing contact with the toothed profile (27) of the screwed portion (26); and
- repositioning of the closure cap (32).

10. The method of claim 9, further comprising flow rate modulation through a rotation of the closing cap (32) to force an axial sliding of the rod (16) for limiting a pre-set fluid passage area through the adjustment orifice (7).

* * * * *